United States Patent
Chaintreuil et al.

(10) Patent No.: US 9,252,703 B2
(45) Date of Patent: Feb. 2, 2016

(54) METHOD OF DIAGNOSING THE FAILURE OF A PHOTOVOLTAIC GENERATOR

(75) Inventors: Nicolas Chaintreuil, Montmelian (FR); Franck Barruel, Chapareillan (FR); Antoine Labrunie, Paris (FR)

(73) Assignee: Commissariat a L'energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/258,783

(22) PCT Filed: Mar. 30, 2010

(86) PCT No.: PCT/EP2010/054240
§ 371 (c)(1),
(2), (4) Date: Nov. 11, 2011

(87) PCT Pub. No.: WO2010/118952
PCT Pub. Date: Oct. 21, 2010

(65) Prior Publication Data
US 2012/0062265 A1 Mar. 15, 2012

(30) Foreign Application Priority Data
Apr. 17, 2009 (FR) ...................................... 09 01886

(51) Int. Cl.
*G01R 31/26* (2014.01)
*H02S 50/10* (2014.01)

(52) U.S. Cl.
CPC ...................................... *H02S 50/10* (2014.12)

(58) Field of Classification Search
CPC ............ G01R 31/2605; G01R 31/405; G01R 31/2603; G01R 31/3624; G05F 1/67
USPC ......... 324/96, 501, 541, 544, 760.01, 762.01; 136/243–265
See application file for complete search history.

(56) References Cited

U.S. PATENT DOCUMENTS

| | | | |
|---|---|---|---|
| 4,163,194 A | 7/1979 | Ross | |
| 4,184,111 A | 1/1980 | Turner | |
| 4,456,880 A * | 6/1984 | Warner et al. | 324/761.01 |
| 4,528,503 A | 7/1985 | Cole | |
| 6,339,538 B1 * | 1/2002 | Handleman | 363/95 |
| 7,309,850 B2 * | 12/2007 | Sinton et al. | 250/203.4 |
| 2004/0027749 A1 * | 2/2004 | Zuercher | H02H 1/0015 361/62 |
| 2004/0264225 A1 * | 12/2004 | Bhavaraju et al. | 363/120 |
| 2006/0164065 A1 * | 7/2006 | Hoouk et al. | 324/76.17 |
| 2009/0146667 A1 * | 6/2009 | Adest et al. | 324/537 |
| 2010/0106339 A1 * | 4/2010 | Little et al. | 700/293 |
| 2010/0164459 A1 * | 7/2010 | Perichon et al. | 323/284 |
| 2010/0176773 A1 * | 7/2010 | Capel | G05F 1/67 323/266 |
| 2011/0109346 A1 * | 5/2011 | Moussaoui et al. | 327/60 |
| 2011/0298442 A1 * | 12/2011 | Waltisperger et al. | 323/299 |

FOREIGN PATENT DOCUMENTS

| | | |
|---|---|---|
| FR | 2912848 A1 * | 8/2008 |
| WO | WO 2004/090559 A | 10/2004 |
| WO | WO 2008/112080 A | 9/2008 |

OTHER PUBLICATIONS

Cull et al., High Speed Computerized Data Acquisition of Photovoltaic V I Characteristics; NASA, Lewis Research Center, Cleveland, Ohio, Jul. 27, 1981.*

* cited by examiner

*Primary Examiner* — Tung X Nguyen
*Assistant Examiner* — Adam Clarke
(74) *Attorney, Agent, or Firm* — Frommer Lawrence & Haug LLP

(57) ABSTRACT

Method of diagnosis for a photovoltaic generator characterized in that it implements a step of observing the evolution of its voltage when it passes from a short-circuit mode of operation to an open-circuit mode or vice versa.

13 Claims, 4 Drawing Sheets

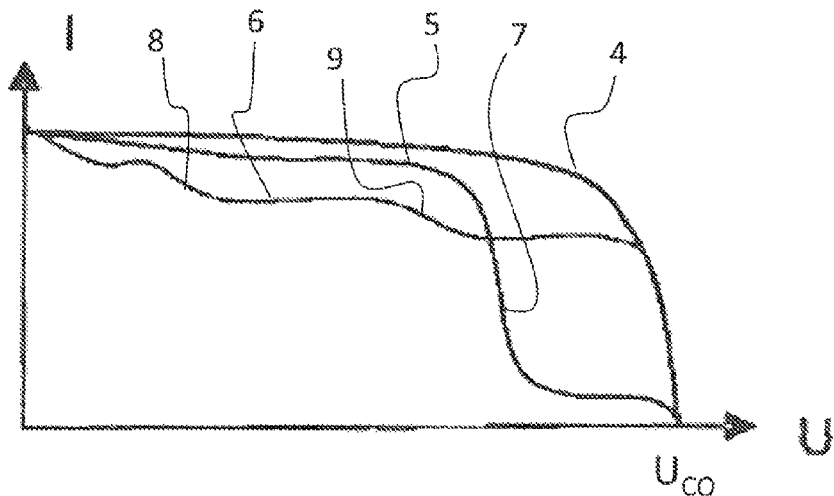
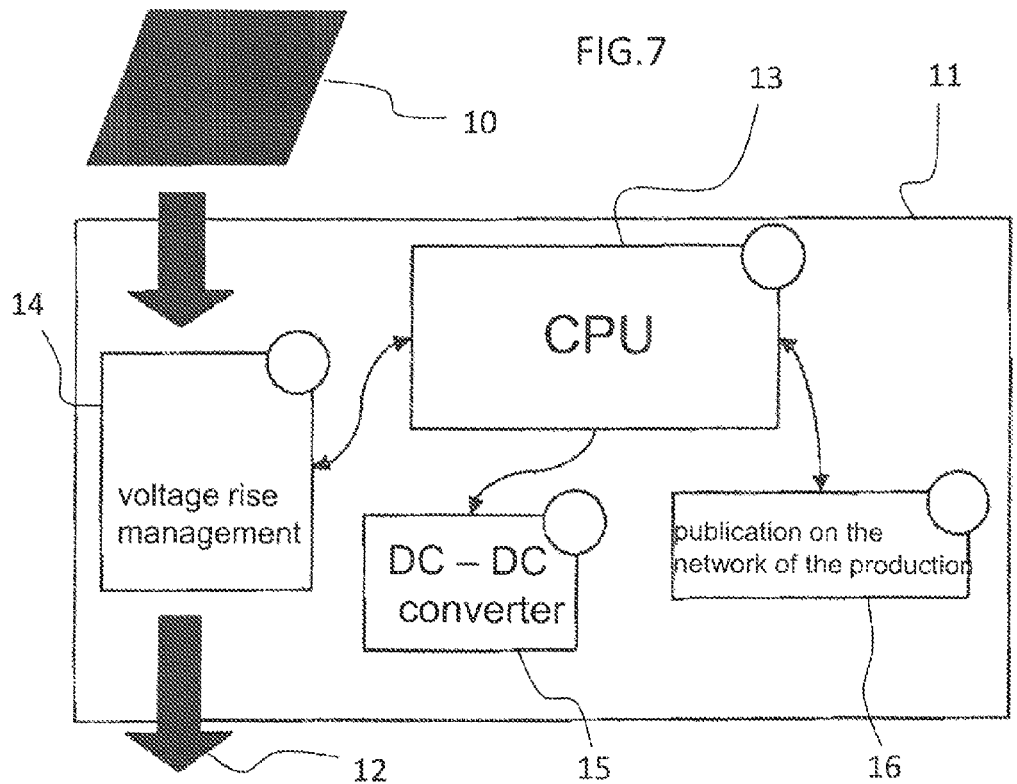

METHOD OF DIAGNOSING THE FAILURE OF A PHOTOVOLTAIC GENERATOR

This application is a 371 of PCT/EP2010/054240 filed on Mar. 30, 2010, published on Oct. 21, 2010 under publication number WO 2010/118952, which claims priority benefits from French Patent Application Number 09/01886 filed Apr. 17, 2009, the disclosure of which is incorporated herein by reference.

The invention relates to a method of diagnosis for a photovoltaic device making it possible to detect the malfunctioning thereof. It is particularly suited to the optimization of the production of a photovoltaic generator. It also relates to a photovoltaic device implementing such a method.

Devices for generating energy from intermittent sources, such as photovoltaic generators, are being increasingly used. The cost of their production depends on their autonomy and on their capacity to diagnose their failure, if possible in real time. The existing devices are not designed for fast reaction in the case of failure, even when their production becomes abnormally low. For this reason, they require complex and expensive maintenance operations.

The conventional management of photovoltaic devices consists in observing their behaviour at the level of the systems linked to these devices, for example by measuring the charge of a battery linked to the device or by measuring the electrical production obtained on an electrical network to which the device is linked. In the case of a measurement that is lower than the expected value, it is concluded that there is a failure of the photovoltaic device. Conventional management such as this exhibits the drawback of being inexact. Indeed, it does not make it possible to distinguish between a normal drop in production caused by shade or particular meteorological conditions and an actual failure of the device. Moreover, it does not make it possible to differentiate various failures of the device like an increase in the resistance of the wiring, for example subsequent to a defect with the connections or an electric arc in the device, or a deterioration of the front face of the photovoltaic generator, for example due to delamination or to corrosion, to shade or to dirt.

The document WO2008112080 describes a solution consisting in comparing values measured at the level of photovoltaic modules with values prerecorded in a normal operating situation in order to detect failures. Such a solution is unwieldy to implement and is not satisfactory since it demands a very large amount of data. For this purpose, a large number of sensors are necessary in order to carry out a large number of measurements, and lengthy processing is necessary to compare these measurements with the recorded data.

Thus, a general object of the invention is to propose a diagnosis solution for a photovoltaic device which does not comprise the drawbacks of the prior art solutions.

More precisely, the invention seeks to achieve all or some of the following objects:

A first object of the invention is to propose a diagnosis solution for a photovoltaic device which makes it possible to detect failure thereof in a reliable and exact manner.

A second object of the invention is to propose a diagnosis solution for a photovoltaic device which makes it possible to detect a failure remotely and in real time.

A third object of the invention is to propose a diagnosis solution for a photovoltaic device which makes it possible to detect a failure in a simple and economic manner.

Accordingly, the invention rests upon a method of diagnosis for a photovoltaic generator, characterized in that it implements a step of observing the evolution of its voltage as a function of time while it passes from a short-circuit mode of operation to an open-circuit mode or vice versa from an open-circuit mode of operation to a short-circuit mode.

For this purpose, the method can furthermore comprise a step of measuring the normal time required to attain a maximum voltage $U_{CO}$ when the photovoltaic generator passes from a short-circuit mode of operation to an open-circuit mode in a non-defective state and/or furthermore comprise a step of measuring the maximum voltage $U_{CO}$.

The step of measuring the maximum voltage $U_{CO}$ can be carried out after the photovoltaic generator has passed from a normal mode of operation to an open-circuit mode.

It can comprise a step of measuring the time required to attain a predefined percentage of the maximum voltage $U_{CO}$ when it passes from a short-circuit mode of operation to an open-circuit mode, and a step of comparing this time with the normal time required in the case of the photovoltaic generator in the non-defective operating state, the photovoltaic generator being considered to be defective if this time exceeds a predefined threshold.

The method can comprise a step of measuring the voltage U across the terminals of the generator after a predefined time when it passes from a short-circuit mode of operation to an open-circuit mode and a step of comparing this voltage with the normal voltage attained in the case of the photovoltaic generator in the non-defective operating state, the photovoltaic generator being considered to be defective if this voltage is below a predefined threshold.

For this purpose, the method can comprise the following additional steps:
opening of a first switch so as to cause the photovoltaic generator to pass from the closed-circuit position to the open-circuit position, by disconnecting it from its load;
measurement of the stabilized maximum voltage, obtained across the terminals of the photovoltaic generator;
closing of a second switch so as to place the photovoltaic generator in short-circuit and then opening of this second switch so as to place it back in open-circuit;
measurement of the voltage across the terminals of the photovoltaic generator obtained after a predefined time and comparison of the measured voltage with the maximum voltage so as to determine the defective or non-defective state of the photovoltaic generator;
closing of the first switch so as to place the photovoltaic generator back in its normal electrical production situation linked up with its load.

The predefined time can lie between $10^{-7}$ and $10^{-2}$ seconds and/or the predefined percentage of the maximum voltage $U_{CO}$ can be greater than 50%.

In the case of diagnosing the failure of the photovoltaic generator, the method can determine the curve of the evolution U(I) of its voltage U as a function of the current I.

According to a second mode of execution of the invention, the method of diagnosis for a photovoltaic generator is characterized in that the step of observing the evolution of its voltage U comprises the observation of the evolution U(I) of its voltage U as a function of the current I.

The method can comprise a step of detecting the kinks in the voltage-current curve so as to deduce therefrom the number of defects as well as the significance of the failure.

The method of diagnosis for a photovoltaic generator can comprise the following additional steps:
opening of a first switch so as to cause the photovoltaic generator to pass from the closed-circuit position to the open-circuit position, by disconnecting it from its load;
measurement of the stabilized maximum voltage $U_{CO}$, obtained across the terminals of the photovoltaic generator;

closing of a second switch so as to place the photovoltaic generator in short-circuit and then opening of this second switch so as to place it back in open-circuit;

measurement of the voltage U and of the current I across the terminals of the photovoltaic generator until the voltage U attains the maximum voltage $U_{CO}$ so as to obtain the curve U(I);

closing of the first switch so as to place the photovoltaic generator back in its normal electrical production situation linked up with its load.

The passage from a short-circuit mode of operation to an open-circuit mode or vice versa can be effected by an inverter.

The invention also pertains to a photovoltaic device comprising a photovoltaic generator comprising several photovoltaic cells, characterized in that it comprises at least two switches so as to allow at least one cell of the photovoltaic generator to pass from a short-circuit mode of operation to an open-circuit mode or vice versa, and in that it comprises a microcontroller or CPU implementing the method of diagnosis for the photovoltaic generator such as described above.

The first switch may be able optionally to link the photovoltaic generator to an external load such as a battery or an electrical network, and the at least one second switch may be in parallel with at least one cell of the photovoltaic generator.

The microcontroller or CPU may be that of an inverter able to link the photovoltaic device to an electrical network or the microcontroller or CPU may be integrated into a housing disposed at the level of the photovoltaic generator.

These objects, characteristics and advantages of the present invention will be set forth in detail in the following description of particular modes of execution given without limitation in conjunction with the appended figures among which:

FIG. 1 schematically illustrates an electrical circuit equivalent to a photovoltaic cell.

FIG. 2 represents the voltage-current curve obtained across the terminals of various photovoltaic cells.

FIG. 3 schematically represents the electrical circuit of two photovoltaic cells in series, one of which is defective.

FIGS. 4 and 5 respectively represent two different procedures for the diagnosis of a photovoltaic generator on the basis of the curves of evolution of the voltage as a function of time across the terminals of a normal and defective photovoltaic generator.

FIG. 6 represents voltage-current curves obtained across the terminals of a photovoltaic generator according to various scenarios.

FIG. 7 illustrates a photovoltaic device according to one mode of execution of the invention.

The invention rests upon the analysis of the evolution of the voltage of a photovoltaic generator as it passes from a short-circuit mode of operation to an open-circuit mode of operation or vice versa. This evolution may be observed through the curve of the voltage as a function of time or through the analysis of the curve representing the current as a function of the voltage at the level of the photovoltaic generator during this change of mode.

Figure 1:
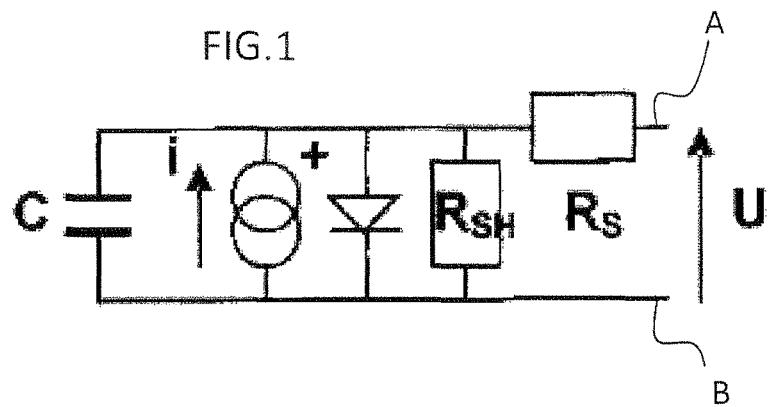

A photovoltaic cell behaves as an electrical circuit such as represented schematically in FIG. 1. It provides a current I and a voltage U on its output terminals AB.

Figure 2:
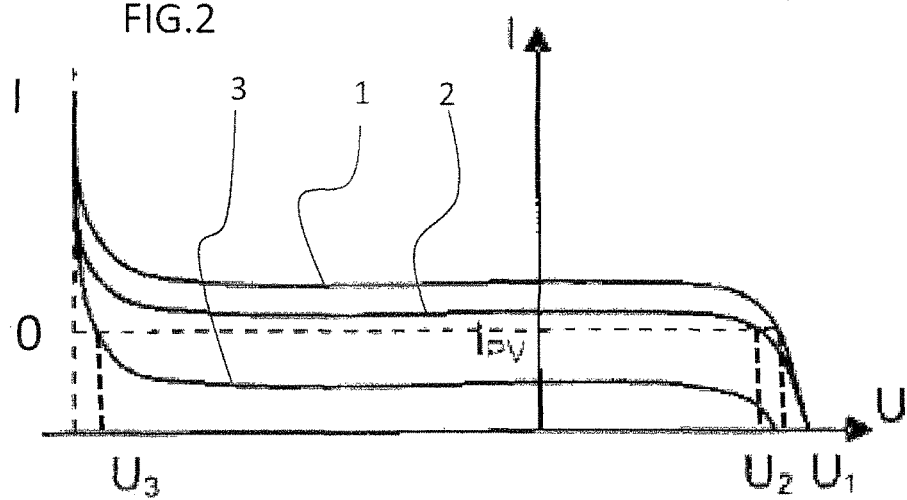

FIG. 2 represents the curve of the current I as a function of the voltage U obtained across the terminals of various photovoltaic cells. Curves 1 and 2 illustrate the case of photovoltaic cells during normal operation, that is to say non-defective cells. Curve 3 illustrates the situation of a photovoltaic cell receiving insufficient or zero irradiation, termed a defective cell. In the case where the current provided by a photovoltaic generator, which comprises several of these photovoltaic cells, rises to a value $I_{PV}$, the photovoltaic cells in the normal operating position will exhibit a positive voltage U1, U2 across their terminals whereas a failed cell will exhibit a negative voltage U3.

Figure 3:
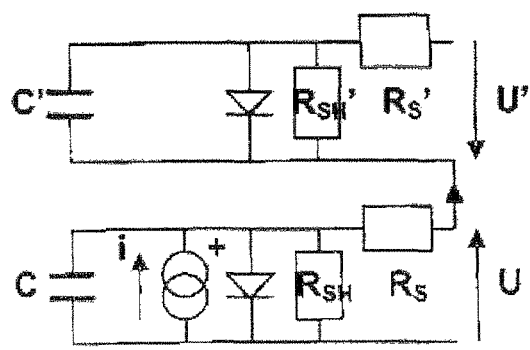

FIG. 3 schematically illustrates the electrical representation of a cell during normal operation placed in series with a failed cell, whose voltage U' is opposite to the voltage U of the cell in the normal operating state. In a defective photovoltaic cell, its capacitor C' is negatively charged, its opposite voltage can attain more than 20 times the value of the nominal voltage of the cell and its maximum current is smaller than that of another cell. In the case of the opening of the circuit linked to a defective cell such as this, the voltage of the defective cell will take a much longer time than that of a normal cell to attain a positive nominal value. This time may be of the order of 20 to 100 times as long.

Thus, the concept of the invention utilizes the previous phenomenon to formulate, according to the response of a photovoltaic generator as it passes from a short-circuit mode to open circuit, a diagnosis of its operation.

Figure 4:
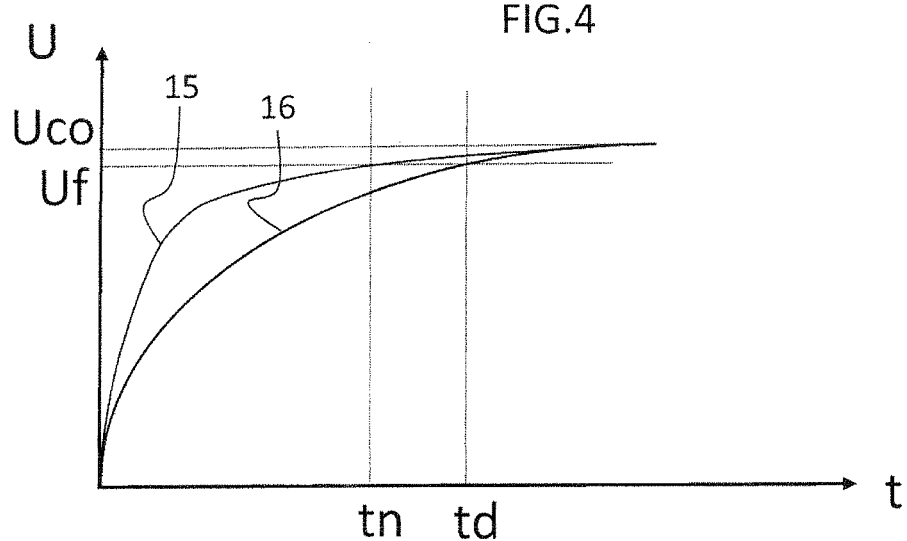
Figure 5:
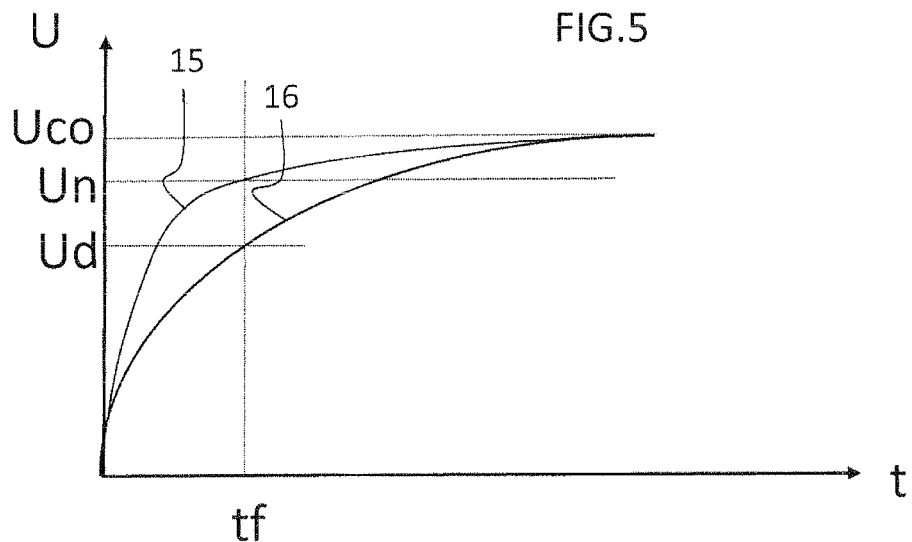

FIGS. 4 and 5 represent curves 15, 16 of evolution of the voltage U as a function of time t across the terminals of a photovoltaic generator as it passes from short-circuit to open circuit, respectively in the case of normal operation and in the case of defective operation. The normal curve 15 shows that the voltage U ultimately converges to a maximum voltage $U_{CO}$. Curve 16 shows that the voltage of a defective generator increases much less quickly.

Thus, a first procedure, represented in FIG. 4, for diagnosing the state of the photovoltaic generator consists in observing the time required to attain a voltage Uf representing a predefined percentage of the maximum voltage $U_{CO}$, for example 95%. In the case of a generator that is operating normally the predefined final value Uf is attained after a normal time tn. In the case of a generator that is defective, the predefined final value Uf is attained after a longer time td. Thus, comparison of the times td and tn allows diagnosis of the state of the photovoltaic generator.

A second procedure, represented in FIG. 5, consists in measuring the voltage obtained for a predefined time tf. In the case of the generator during normal operation, a normal value Un is attained after the time tf. In the case of the defective generator, a lower final value Ud is attained after the time tf. Thus, comparison of the voltages Un and Ud allows diagnosis of the state of the photovoltaic generator.

FIG. 6 illustrates three U(I) curves 4, 5, 6 obtained according to respectively three different scenarios when a photovoltaic generator passes from a short-circuit situation to an open-circuit situation. Each U(I) curve is the sum of the U(I) curves of each of the photovoltaic cells making up the photovoltaic generator. Equivalent curves would be obtained on passing from an open-circuit situation to a short-circuit situation.

Curve 4 represents a photovoltaic generator in which all the photovoltaic cells are in the proper operating state. Upon opening the circuit, the current will attain a zero value whereas the voltage will attain a maximum value $U_{CO}$ after a relatively short time. Curve 5 represents the same curve obtained in the case of a generator comprising at least one defective photovoltaic cell. This curve exhibits a kink 7 in the course of which the current drops more rapidly while the voltage increases little. Curve 6 illustrates another example in which the curve exhibits two kinks 8, 9, which indicate the presence of at least two defective photovoltaic cells. In all cases, the same voltage value $U_{CO}$ is ultimately attained, though after a much longer time in the case of curves 5, 6 for the generators exhibiting at least one failed cell, as was explained hereinabove. These examples make it possible to illustrate several situations and teach that the U(I) curves make it possible to obtain the following diagnoses:

there are as many defects in the device as there are kinks 7, 8, 9;

the more significant the kink, the more significant the failure.

The above explanations wilt be utilized in a mode of execution of a photovoltaic device equipped with a device allowing diagnosis of its operation, represented in FIG. 7.

The photovoltaic device of FIG. 7 comprises a photovoltaic generator 10, which can comprise one or more photovoltaic cells, and which is linked to the electrical network by a link 12 by way of an inverter 11. This inverter is managed by a microcontroller or CPU 13, whose main function is to determine the operating point of the photovoltaic generator 10 and its link with the network 12. For this purpose, it is in contact with a block 14 for managing the voltage rise, a DC-DC converter 15, and a block 16 for managing the publication on the network of the production. To fulfil its function, the CPU 13 regularly instructs the following measurements:

voltage and current provided by the DC panel;
DC-side isolation measurement;
network presence measurement;
current and voltage injected onto the AC network.

According to the invention, the photovoltaic device moreover comprises a diagnosis device integrated into the inverter 11 described hereinabove, whose CPU implements the method of diagnosis for the photovoltaic generator and in particular for detecting failures, which will be described further on. The diagnosis device corresponds to the electrical diagram represented in FIG. 8. The CPU 13 of the inverter receives the measurements of the current I and of the voltage V of the photovoltaic generator 10 and controls two breakers (or switches) T1, T2. In the normal operating situation of electrical production, the switch T2 is closed whereas the switch T1 is open. As a variant, other devices are possible, in particular relying on at least one switch. As a variant, the diagnosis device could be integrated into any other distinct housing of the inverter, such as a housing positioned at the level of at least one photovoltaic cell for example. According to a variant embodiment, other functions, such as a function for electric arc detection within the photovoltaic generator, could be integrated into such a housing. Thus, the method of the invention is implemented by software installed on a microcontroller or any medium, which is thereafter integrated into the photovoltaic device, and operates on the basis of receiving measurements in phase with the control of the switch or switches.

Such a device can allow the implementation of the method for its diagnosis according to a first embodiment comprising the following steps:

opening of the switch T2 so as to cause the photovoltaic generator to pass from a closed-circuit mode to an open-circuit mode;

measurement of the stabilized maximum voltage $U_{CO}$, obtained across the terminals of the photovoltaic generator after a certain time (stabilization time), when the current is zero;

closing of the switch T1 so as to place the photovoltaic generator in short-circuit and then opening of the switch T1 so as to place it back in open-circuit;

measurement of the voltage U across the terminals of the photovoltaic generator obtained after a predefined time t. In this mode of execution, t is chosen equal to 15 microseconds. Any value relatively close to the time required for the generator in the non-defective operating situation to attain a predefined percentage of the stabilized maximum voltage $U_{CO}$ is suitable, this time being either measured, or estimated. The predefined time t will therefore be large enough for the voltage to approach the maximum voltage $U_{CO}$ of the generator, at least for the case of a non-defective generator. Thus, more generally, a value lying between $10^{-7}$ and $10^{-2}$ seconds could be chosen for this predefined time;

comparison of the measured voltage U with the predefined percentage of the maximum voltage $U_{CO}$:

if the measured voltage U attains a certain predefined percentage of the maximum voltage $U_{CO}$, then the generator is considered to be operating normally and the switch T2 is closed so as to place the generator back in its normal electrical production situation. The predefined percentage is fixed at 95% in this mode of execution. It could take other values, since it depends on the predefined time t, and could for example take any other value preferably greater than 50%;

if the measured voltage U does not attain the predefined percentage of the maximum voltage $U_{CO}$ then the generator is considered to be defective.

According to another embodiment of the invention, it is possible to observe the voltage-current curve U(I) determined while the device passes from a short-circuit mode of operation to an open-circuit mode. For this purpose, the following steps are carried out:

closing of the switch T1 so as to place the photovoltaic generator back in short-circuit and then opening of the switch T1 so as to place it back in open-circuit;

measurement of several voltage and current points according to a predefined frequency $f_{acq}$, this frequency advantageously lying between 100 kHz and 1 MHz;

when the voltage attains the value $U_{CO}$, then the switch T2 is closed so as to place the generator back in its normal electrical production situation;

the measured points are transmitted and analysed by the CPU 13 of the photovoltaic device, which can thus deduce the number of defects and the significance of the degradation.

According to a variant embodiment in reciprocal mode, only the first step is modified; the switch T1 is firstly opened and then closed so as to generate a passage from an open circuit to a short-circuit.

As a variant, the two modes of execution described previously may be amalgamated. For example, the first mode of execution relying on the analysis of the evolution as a function of time of the voltage as it passes from a short-circuit mode of operation to an open-circuit mode of operation may be followed, in the case where a defect is detected, by the determination and by the observation of the evolution of the curve U(I) so as to deduce therefrom complementary information about the defects of the device.

According to an advantageous realization of the invention, the time required for the implementation of the diagnosis is small enough to allow its execution without complete disabling of the inverter 11, which, in the converse case, would then require a significant time, possibly as much as several minutes, to produce its maximum power again. For this purpose, it should be noted that the inverter comprises a capacitive bus making it possible to store energy corresponding to at least one millisecond of injection onto the network. The time required for the voltage of the photovoltaic generator to attain its maximum value on passing to open circuit depends on the current and on the equivalent capacitance of the generator 10. By way of remark, this time varies weakly as a function of the irradiation and of the intrinsic characteristics of the cells. Thus, by choosing a fast power transistor, components T1, T2, with fast switching, for example of the order of a microsecond, and/or appropriate measurement means, it is possible to implement the diagnosis in a time of less than 1 millisecond, thereby making it possible not to disable the inverter and not to penalize electrical production. The method of diagnosis is implemented periodically, and thus makes it possible to check the device in real time.

A method of diagnosis for the photovoltaic device has been described by way of example according to the first mode of execution of the invention. Of course, other variants are possible, relying on the variation of the time required to attain the maximum voltage $U_{CO}$ across the terminals of the generator in an open-circuit situation. This maximum voltage is not necessarily measured at each implementation of the method of diagnosis but it may for example be measured just once when the generator is brand new, during non-defective normal operation, and stored. Likewise, the time required to attain this value may be measured simultaneously, and stored so as to serve as the basis for the diagnosis steps.

Thus, a possible variant of the first mode of execution of the method of diagnosis of the generator can consist in systematically waiting, as the generator passes to open circuit, until the voltage attains the maximum voltage, measuring the time required and comparing it with the normal time in the case of proper operation. If this time exceeds the normal time by a predefined percentage, then the generator is considered to be defective.

Figure 8:
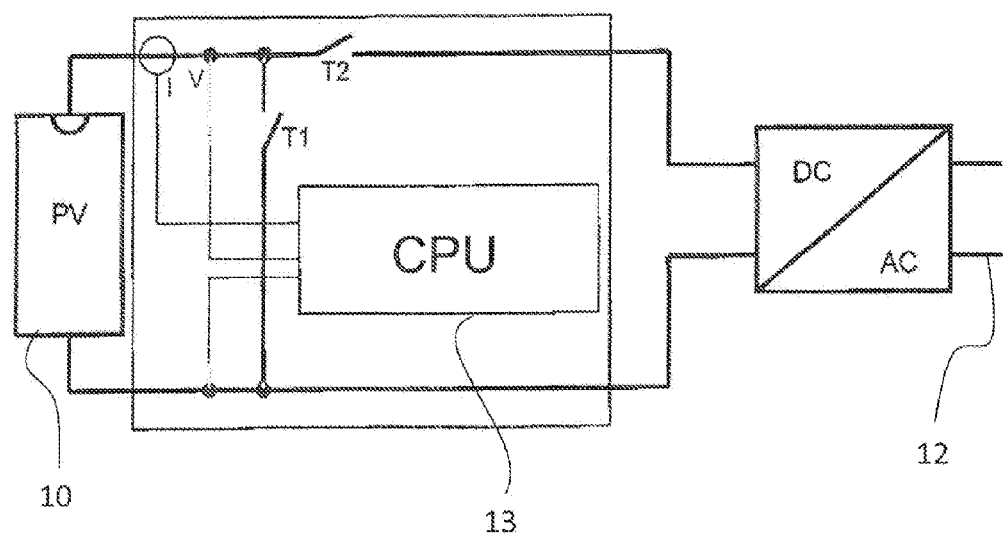
FIG. 8 represents the electrical circuit implemented for the diagnosis of the photovoltaic device according to the mode of execution of the invention.

The method of diagnosis has been described on the basis of a diagnosis device corresponding to the electrical diagram represented in FIG. 8. According to an advantageous variant, the diagnosis could be effected by using the input structure of a photovoltaic inverter. Conventionally, these inverters use power electronics components, either in series, or in parallel, or both, that can make it possible to disconnect the inverter part (DC/AC converter stage) from the chopper part (DC/DC converter stage) of the "photovoltaic inverter" apparatus and/ or to carry out the DC/DC conversion function. These components can perform the passage from short-circuit to open circuit of the photovoltaic generator or generators connected at input and thus make it possible to effect the diagnosis. This functionality could thus be implemented easily and mainly by virtue of software adaptations to existing inverters.

The invention thus achieves the objects sought, and allows exact and swift diagnosis of a photovoltaic generator, makes it possible in particular to determine in the case of a drop in production whether the drop originates from a defect of the photovoltaic generator or is related to defective wiring or connections. The maintenance personnel can thus be advised swiftly and exactly of the failure.

The invention claimed is:

1. Method of diagnosis for a photovoltaic generator, comprising:
   closing a switch linked to the two terminals of the photovoltaic generator so as to place the photovoltaic generator in short-circuit mode; and
   observing the evolution of its voltage (U) as a function of time while the photovoltaic passes from a short-circuit mode of operation to an open-circuit mode or vice versa from an open-circuit mode of operation to a short-circuit mode,
   measuring a normal time required to attain a maximum voltage ($U_{CO}$) when the photovoltaic generator passes from a short-circuit mode of operation to an open-circuit mode in a non-defective state and/or further measuring the maximum voltage ($U_{CO}$), and
   measuring the time required to attain a predefined percentage of the maximum voltage ($U_{CO}$) when it passes from a short-circuit mode of operation to an open-circuit mode, and a step of comparing this time with the normal time required in the case of the photovoltaic generator in the non-defective operating state, the photovoltaic generator being considered to be defective if this time exceeds a predefined threshold.

2. Method of diagnosis for a photovoltaic generator according to claim 1, wherein the step of measuring the maximum voltage ($U_{CO}$) is carried out after the photovoltaic generator has passed from a normal mode of operation to an open-circuit mode.

3. Method of diagnosis for a photovoltaic generator according to claim 1, comprising a step of measuring the voltage (U) across the terminals of the generator after a predefined time when it passes from a short-circuit mode of operation to an open-circuit mode and a step of comparing this voltage with the normal voltage attained in the case of the photovoltaic generator in the non-defective operating state, the photovoltaic generator being considered to be defective if this voltage is below a predefined threshold.

4. Method of diagnosis for a photovoltaic generator according to claim 3, comprising the following additional steps:
   opening of a first switch (T2) so as to cause the photovoltaic generator to pass from the closed-circuit position to the open-circuit position, by disconnecting it from its load;
   measurement of a maximum voltage ($U_{CO}$), obtained across the terminals of the photovoltaic generator;
   closing of a second switch (T1) so as to place the photovoltaic generator in short-circuit and then opening of this second switch (T1) so as to place it back in open-circuit;
   measurement of the voltage (U) across the terminals of the photovoltaic generator obtained after a predefined time (t) and comparison of the measured voltage (U) with the maximum voltage ($U_{CO}$) so as to determine the defective or non-defective state of the photovoltaic generator;
   closing of the first switch (T2) so as to place the photovoltaic generator back in its normal electrical production situation linked up with its load.

5. Method of diagnosis for a photovoltaic generator according to claim 3, wherein the predefined time lies between $10^{-7}$ and $10^{-2}$ seconds and/or in that the predefined percentage of a maximum voltage ($U_{CO}$) is greater than 50%.

6. Method of diagnosis for a photovoltaic generator according to claim 1, wherein in the case of diagnosing the failure of the photovoltaic generator, the method determines the curve of the evolution U(I) of its voltage (U) as a function of the current (I).

7. Method of diagnosis for a photovoltaic generator according to claim 1, wherein the step of observing the evolution of its voltage (U) moreover comprises the observation of the evolution U(I) of its voltage (U) as a function of the current (I).

8. Method of diagnosis for a photovoltaic generator according to claim 7, comprising a step of detecting one or more kinks in the voltage-current curve so as to deduce therefrom the number of defects as well as the significance of the failure.

9. Method of diagnosis for a photovoltaic generator according to claim 8, comprising the following additional steps:

opening of a first switch (T2) so as to cause the photovoltaic generator to pass from the closed-circuit position to the open-circuit position, by disconnecting it from its load;

measurement of a maximum voltage ($U_{CO}$), obtained across the terminals of the photovoltaic generator;

closing of a second switch (T1) so as to place the photovoltaic generator in short-circuit and then opening of this second switch (T1) so as to place it back in open-circuit;

measurement of the voltage (U) and of the current (I) across the terminals of the photovoltaic generator until the voltage (U) attains the maximum voltage ($U_{CO}$) so as to obtain the curve U(I);

closing of the first switch (T2) so as to place the photovoltaic generator back in its normal electrical production situation linked up with its load.

10. Method of diagnosis for a photovoltaic generator according to claim 1, wherein the passage from a short-circuit mode of operation to an open-circuit mode or vice versa is effected by an inverter.

11. Photovoltaic device comprising a photovoltaic generator comprising several photovoltaic cells, wherein it comprises at least two switches (T1; T2) so as to allow at least one cell of the photovoltaic generator to pass from a short-circuit mode of operation to an open-circuit mode or vice versa, and in that it comprises a microcontroller or CPU implementing the method of diagnosis for the photovoltaic generator according to claim 1.

12. Photovoltaic device according to claim 11, wherein the microcontroller or CPU is that of an inverter able to link the photovoltaic device to an electrical network or in that the microcontroller or CPU is integrated into a housing disposed at the level of the photovoltaic generator.

13. Photovoltaic device according to claim 11, wherein a first switch (T2) is able optionally to link the photovoltaic generator to an external load such as a battery or an electrical network, and in that at least one second switch (T1) is in parallel with at least one cell of the photovoltaic generator.

* * * * *